Feb. 25, 1958  A. S. DAW  2,824,410
PLANT PROPAGATING APPARATUS
Filed Sept. 16, 1955  2 Sheets-Sheet 1

INVENTOR.
ALFRED S. DAW
BY
McMorrow, Berman & Davidson
ATTORNEYS

Feb. 25, 1958     A. S. DAW     2,824,410
PLANT PROPAGATING APPARATUS
Filed Sept. 16, 1955     2 Sheets-Sheet 2
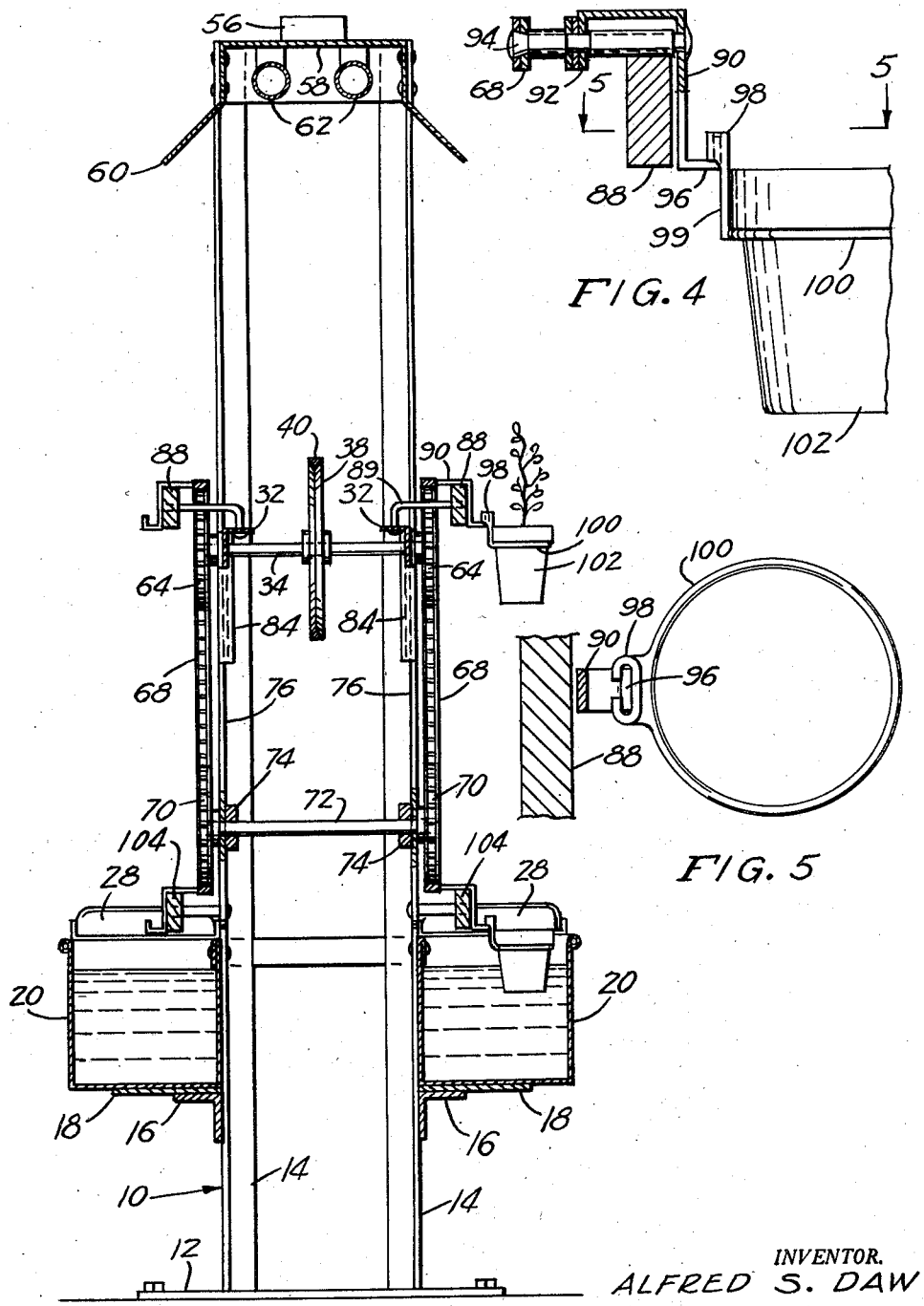
INVENTOR.
ALFRED S. DAW
BY
McMorrow, Berman + Davidson
ATTORNEYS United States Patent Office 2,824,410
Patented Feb. 25, 1958

2,824,410

PLANT PROPAGATING APPARATUS

Alfred S. Daw, Naperville, Ill.

Application September 16, 1955, Serial No. 534,745

3 Claims. (Cl. 47—1)

This invention relates to an apparatus adapted for the propagation of small plants, under circumstances which will simulate closely the optimum conditions under which said plants will grow.

Summarized briefly, the invention comprises a support frame on which is mounted a series of rotatable sprockets, about which is trained a chain provided with means at intervals for dependingly supporting a plurality of flower pots in which the plants are contained. By reason of a timing and gear reduction mechanism, the chain is rotated only at prescribed intervals, and when placed in movement, makes one complete rotation each twenty-four hours. During the rotation of the chain, the supported flower pots are for a predetermined period of time immersed in a water tank, and for another, predetermined period of time are passed in proximity to an overhead light. In a working apparatus, the pots have each been immersed for a period of approximately two hours, and have been passed under the light for a period of approximately twelve hours, during each twenty-four hour cycle.

By reason of the construction discussed above, the apparatus is so designed as to support any desired number of plants, said number depending, of course, on the number of chains provided upon the apparatus, the lengths of said chains, and the number of holders on each chain. In any event, the construction is so designed as to insure that the plants will be given optimum growing conditions, during the early stages of their growth, thus to cause rapid and healthy growth of the same.

Another object of importance is to provide a device as stated which will be adapted for adjustment of the overall length of the chain, so that the chain can be lengthened to suit the particular needs of the user.

A further object is to provide apparatus as described which will be particularly designed to permit the chains to be supported upon the frame in laterally spaced relation, so that the single drive mechanism will drive both chains, and the number of flower pots capable of being supported on the particular apparatus can be unusually great in relation to the overall size of the apparatus.

Another object of importance is to provide a plant propagation apparatus as described which will be so designed as to facilitate its manufacture from readily obtainable components, will be rugged, substantially trouble free in operation, and will be capable of use in existing greenhouse installations as well as in other environments, both commercial and non-commercial.

Other objects will appear from the following description, the claims appended thereto, and from the annexed drawings in which like reference characters designate like parts throughout the several views and wherein:

Figure 3 is an enlarged transverse sectional view on line 3—3 of Figure 1;

Figure 4 is a greatly enlarged detail sectional view on line 4—4 of Figure 1; and Figure 5 is a detail sectional view, on the same scale as Figure 4, on line 5—5 of Figure 4.

Figure 1:
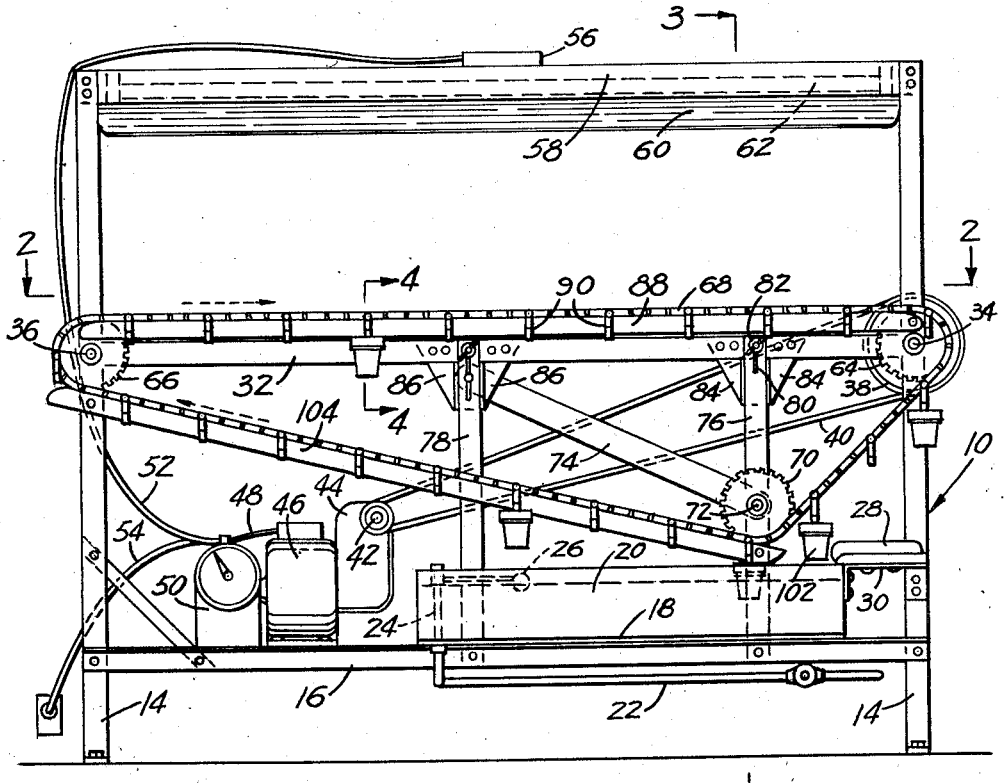
Figure 1 is a side elevational view of a plant propagation apparatus formed according to the present invention.
Figure 2:
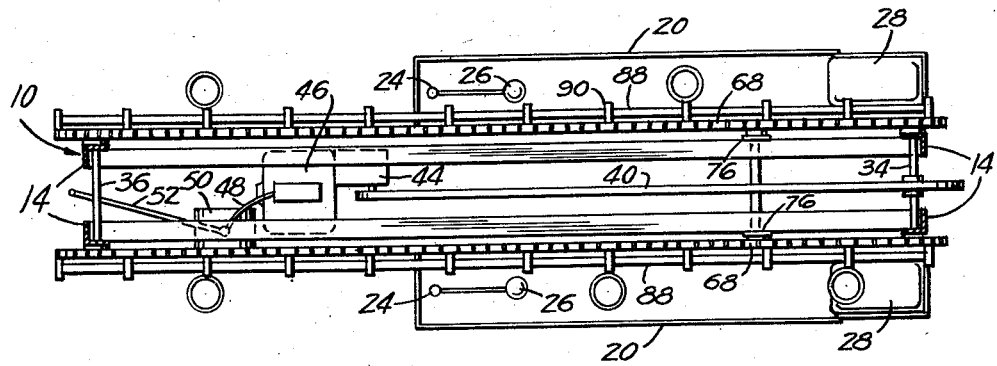
Figure 2 is a top plan view.

The apparatus includes an upstanding, open, rectangular framework generally designated 10, including elongated, vertically disposed corner posts 14 of angle iron material or the like, mounted upon a base plate 12. The corner posts are suitably cross braced as desired, and connected fixedly between the lower end portions of the respective posts, and extending horizontally along opposite sides of the framework, are lower longitudinal frame members 16. Fixedly secured to and supported upon the members 16, in positions extending outwardly from the respective sides of the frame in a common horizontal plane, are support ledges 18, these being disposed adjacent one end of the frame, this being the right hand end, viewing the same as in Figure 1.

Supported upon the respective ledges 18 are elongated, horizontally disposed water tanks 20, to which water is forced under pressure through pipes 22, the pipes having risers 24 extending upwardly within the tanks and terminating at their upper ends in valves controlled by floats 26. By reason of this arrangement, whenever the level of water in the tank falls below a predetermined level, the floats will drop and cause the valve to open, so that additional water is supplied to the tank, to return the same to the prescribed level.

At this point, the description to be provided hereinafter will be confined only to the portion of the apparatus disposed at one side of the frame, except in relation to the drive mechanism and other parts common to the conveyor chain assembly at opposite sides of the frame. Since the conveyor chain assemblies are identically but oppositely formed, the description of one will suffice for both.

At one end, there is secured to each tank 20 a horizontally disposed, upwardly flanged ledge 28, supported upon a bracket 30 fixedly connected between the water tank and the adjacent corner post 14. The bracket 30 serves not only to support the small ledge 28, but also serves to fixedly secure the water tank in proper position, said tank also being secured, fixedly in a preferred embodiment, to the ledge 18. This, of course, is not critical to the invention, but the construction is preferred in view of the use of pipe 22 projecting through the wall of the tank to the interior thereof. The ledges or shelves 28 can be used to support small articles such as tools, or brushes for cleaning the tanks, the supported items being of course out of the path of the flower pots carried by the conveyor chain.

A pair of upper horizontal frame members 32 is provided, these being fixedly connected between the corner posts 14 at a location approximately medially between the opposite ends of the corner posts. The upper horizontal frame members 32 are provided with bearing openings, in which are mounted bearings, receiving the opposite ends of transverse shafts 34, 36 disposed in a horizontal plane common to that of the upper side frame members 32.

Secured to the shaft 34 medially between the opposite ends thereof (Figure 3) is a relatively large drive pulley 38 for said shaft, the shaft 34 constituting the conveyor chain drive shaft and having driving connections at its opposite ends to the conveyor chains mounted upon the respective sides of the framework in the manner shown in Figure 3. A belt 40 is trained about the pulley 38, and passes about a small pulley 42 secured to the laterally projecting portion of a stub shaft, that extends out of and is driven by a gear reduction mechanism 44 mounted upon the framework in a position to be driven by a conventional electric motor 46. A conductor 48 extends to the motor, and connected in circuit to the motor through the medium of said conductor is a main timing mechanism 50. A conductor 52 extends from the timing mechanism 50, and power is supplied to the motor through said timing mechanism by means of a conductor 54 connectable to the conventional house electric supply. Conductor 52 extends to a secondary timing mechanism 56, connected in circuit with side by side, elongated, horizontally disposed lamp means comprising a horizontally positioned hood 58 (Figure 3) formed along opposite side edges thereof with depending, downwardly flared side flanges or deflectors 60. Mounted within the hood or support 58 is a pair of fluorescent lamp tubes 62, so arranged relative to the hood and deflectors 60 as to cast their beams upon supported plants as the plants travel along the horizontal frame members 32, upon the upper flight of the conveyor chain.

The particular electrical connections and circuitry can be varied, but the circuit arrangement shown is one in which at periodic intervals, the entire apparatus is turned on, by the primary timer mechanism 50. For example, the primary timer mechanism 50 can be set for effecting operation of the device through a single twenty-four hour cycle, with predetermined intervals occurring between said cycles. Alternatively, said cycles can follow closely upon one another or, in fact, can be continuous over a number of days, all this depending upon how the particular timing mechanism 50 is set. The timing mechanism, per se, is not illustrated in detail herein, since timing devices, to provide for turning on and turning off electrically energized assemblies at predetermined intervals, and for predetermined lengths of time, are capable of being purchased on the open market.

The timing mechanism 56 is placed in circuit with the source of electricity only when the timing mechanism 50 turns on the entire apparatus, and thus, when mechanism 50 turns on the motor 46, the motor will operate for twenty-four hours. The gear reduction mechanism 44 is such that it effects a rotation of the conveyor chain through a single cycle over each twenty-four hour period. At a predetermined time within said twenty-four hour period, the timing mechanism 56 acts to switch on the lamp 58, and said lamps remain on for a prescribed period of time, as for example twelve hours.

It will be understood that if desired, a single timer can be employed, as for example the timer 56, with this timer turning on the complete apparatus at the prescribed intervals, for a twenty-four hour period of time. Under these circumstances, the lamps would be on for the entire twenty-four hour period, but of course, the rate of movement of the conveyor chain is such that each flower pot, when it arrives at the upper flight of the chain, remains in close proximity to the lamps, to receive the benefits of the light emanating therefrom, for a prescribed period of time, as for example twelve hours.

Secured to the opposite ends of the drive shaft 34 are drive sprockets 64, and trained about said sprockets are conveyor chains 68. The chains 68 are arranged as shown in Figure 1, with the upper flight of each chain being extended horizontally, in close proximity to the upper side frame member 32. Sprockets 66 are mounted upon the shaft 36 at the opposite ends of the device, and the chain is meshed with the sprockets 66, these being idler sprockets used for the purpose of disposing the flights of the chain along proper paths.

The chains have been designated at 68, and at the lower flights thereof, are in mesh with vertically adjustable idlers 70, the purpose of the idlers 70 being to force the lower flight downwardly, into close proximity to the surface of the water within the tank 20. Idler sprockets 70 at opposite sides of the framework are mounted upon a horizontally disposed shaft 72, journaled in bearings provided in the outer ends of vertically swingable arms 74, said arms having pivotal connections to vertically adjustable members 76, said members 76 having openings receiving the shaft 72. The members 76 are spaced longitudinally of the frame from other vertical members 78, connected between the lower and upper horizontal side frame members 32, 16, and the members 78 are provided with pivot pins adjacent their upper ends to which the arms 74 are connected, the arms 74 swinging about the axis of their connections to the vertical members 78.

Adjacent its upper end, each vertical member 76 has a relatively short longitudinal slot 80, receiving an adjusting bolt 82, said bolt 82 being adapted to clamp the vertical member 76 in selected positions to which it is vertically adjusted. The members 76, 78 are slidable between triangular brackets depending from the upper side frame members 32, the brackets receiving the members 76 being designated at 84 and being shown to particular advantage in Figure 1. Guides 86, similar to the guide brackets 84, are also secured to the upper horizontal frame members 32, and the member 78 is mounted between brackets 86 for vertically slidable adjustment.

The purpose of the adjustable connection at the upper end of the member 78, and that of the upper end of member 76, is to permit the swinging movement of the arm 74 while the member 76 is being vertically adjusted. However, obviously any other means can be employed to facilitate the vertical adjustment of the sprocket 70, it being mainly important that adjusting means be provided for said sprocket, so that it will be adapted to bear against the conveyor chain, regardless of the particular length of the chain being used, in a manner to hold the conveyor chain in proximity to the surface of the water within the tank 20.

Under some circumstances, an additional sprocket may be employed, adjacent the sprocket 70, bearing against the lower flight of the chain, from the underside of the chain. The purpose of this arrangement would be to insure the proper movement of the flower pot out of the water, should the chain be longer than that illustrated. This, however, is optional and may or may not be embodied in the invention, as desired, the use of the additional sprocket depending to a great extent upon the size of the particular apparatus and the length of the particular chain used.

Referring now to the means for supporting the flower pots, reference should be had to Figures 3, 4, and 5. An upper flight support bar 88 is extended horizontally, from one to the other end of the frame, said bar 88 being spaced laterally, outwardly from the side frame member 32 as shown in Figure 3. Bar 88 is supported at uniformly spaced intervals by brackets 89 of inverted L-shape, secured at their inner ends to the side frame members 32 and projecting outwardly from said members below the flight of the conveyor chain. The chain links are disposed inwardly from the bar 88, as shown in Figure 4, and disposed in close proximity to the outer surface of bar 88 is a flower pot support bracket 90 of substantially inverted L-shape, having a horizontal leg formed with a depending extension 92 at its free end, receiving a stub axle 94 constituting a part of the chain link 68. The axle 94 has a roller sleeve which underlies the horizontal leg of the support bracket 90, in rollable contact with the top surface of the bar 88, and thus the upper flight of the chain is supported perfectly horizontally, during its movement.

At its outer end, the bracket 90 is formed with a short, outwardly projecting extension 96 terminating at its free end in an upwardly projecting finger, receiving a sleeve 98 formed upon the upper end of a short support rod 99, integral or otherwise made rigid at its lower end with a flower pot support ring 100, adapted to engage the downwardly facing shoulder conventionally provided upon a clay flower pot 102.

It will be seen that in this manner, the flower pot is supported laterally, outwardly from the conveyor chain, and will remain vertically disposed regardless of the particular distribution of its associated support about the length of the chain. In other words, even when the chain is passed about one of the sprockets, the flower pot will remain vertically disposed, due to the fact that the bracket 90 is in effect pivoted upon the stub axle 94, with the weight of the flower pot at the lower end of the bracket 90 maintaining the bracket in a vertical position.

In use of the apparatus, the chain, in a preferred embodiment, will make one complete cycle in twenty-four hours, and at a predetermined time during this twenty-four hours, each flower pot will be partially immersed in water within the tank 20, as shown in Figure 1. In a working embodiment, each flower pot is immersed for approximately two hours, being then, by changing of the direction of the lower flight of the chain due to its passage about sprocket 70, raised out of the water. Then, the flower pot travels to the left in Figure 1, along the inclined lower flight of the chain, which inclined lower flight can be supported upon an inclined bar 104 serving the same function as the support bar 88. Ultimately, the flower pot will arrive at the left hand end of the frame as shown in Figure 1, and will now, after passing about sprocket 66, travel toward the opposite end of the frame, in a horizontal path along the bar 88. At this time, the flower pot is in close proximity to the fluorescent lamps 60, receiving the full benefit of the light emanating from said lamps. In a working embodiment, the plants are exposed to approximately twelve hours of direct light, and of course, this exposure occurs at a predetermined period of time following removal or passage of the flower pots from the water tank.

It will be seen that each plant is, by reason of the construction illustrated and described, subjected to a movement, over a twenty-four hour period of time, that causes the plant to receive two hours of watering, and twelve hours of light, creating optimum growing conditions.

In this connection, the movement of the conveyor chain is so slow as to not to cause said movement to affect the growth of the plants in any manner, thus insuring that there will be no disturbance of a proper rate of plant growth when the apparatus is in use.

It is believed apparent that the invention is not necessarily confined to the specific use or uses thereof described above, since it may be utilized for any purpose to which it may be suited. Nor is the invention necessarily limited to the specific construction illustrated and described, since such construction is only intended to be illustrative of the principles it being considered that the invention comprehends any minor change in construction that may be permitted within the scope of the appended claims.

What is claimed is:

1. Apparatus for propagating plants in pots, comprising an upstanding, open, horizontally elongated framework; at least one conveyor chain mounted upon said framework, said chain including a substantially horizontally extending upper flight and a lower flight spaced below the upper flight and inclined for a substantial part of its length from the horizontal; means for driving the chain; a plurality of pot support brackets carried by and spaced along the length of the chain at uniform intervals, each bracket having a portion of substantially inverted L-shape formed with a horizontal leg including a depending extension at one end, said portion also including a vertical leg extending downwardly from the other end of the horizontal leg, each bracket being formed at the lower end of the vertical leg with an outwardly projecting extension terminating its free end in an upwardly projecting finger, the bracket further including a pot support ring in a horizontal plane and a support rod projecting upwardly from the ring and having a sleeve at its upper end receiving the finger of the second named extension, selected links of the chain including stub axles, the first named extensions of the several brackets having openings receiving the stub axles to connect the brackets to the chain; lamp means mounted upon the frame adjacent the upper flight of the chain, for subjecting to light plants growing in pots supported by said brackets during the time the brackets are carried by the upper flight of the chain; a water tank mounted upon the frame work below the inclined flight of the chain for immersion of the supported pots into the water confined within said tank when the pots are suspended by the brackets from the lower flight of the chain; and sprockets carried by the frame in engagement with the lower flight of the chain, arranged to extend said lower flight in close proximity to the tank at a selected location along the length of the lower flight, for effecting the timed immersion of the supported pots within the tank.

2. The apparatus according to claim 1 which includes in addition support bars respectively extending in parallelism with the upper and lower flights of the chain below the horizontal legs of the brackets, said stub axles extending between the vertical legs of the brackets and the first named depending extensions of the brackets, the stub axles including sleeves circumposed thereabout and freely rotatable on the stub axles in the space between the vertical legs and the first named extensions of the brackets, said sleeves being rollably supported upon the support bars to support the chains against sagging and to hold the brackets against tilting movement in a direction transversely of the chain.

3. The apparatus according to claim 2 in which said vertical leg and the first named extension of each bracket are freely rotatable about the axle, for maintenance of the pot support ring in a horizontal plane during the travel of the conveyor chain, and said sleeve and second named extension of each bracket are of complementary, non-circular section to hold the support ring against rotatable movement relative to the vertical and horizontal legs of the bracket.

References Cited in the file of this patent
UNITED STATES PATENTS

| | | |
|---|---|---|
| 1,793,626 | McCormick | Feb. 24, 1931 |
| 2,244,677 | Cornell | June 10, 1941 |

FOREIGN PATENTS

| | | |
|---|---|---|
| 301,474 | Germany | Oct. 25, 1917 |